May 2, 1933. C. P. SCHLEGEL 1,906,814
FINISHING WELT FOR UPHOLSTERING
Filed Aug. 13, 1930 5 Sheets-Sheet 1
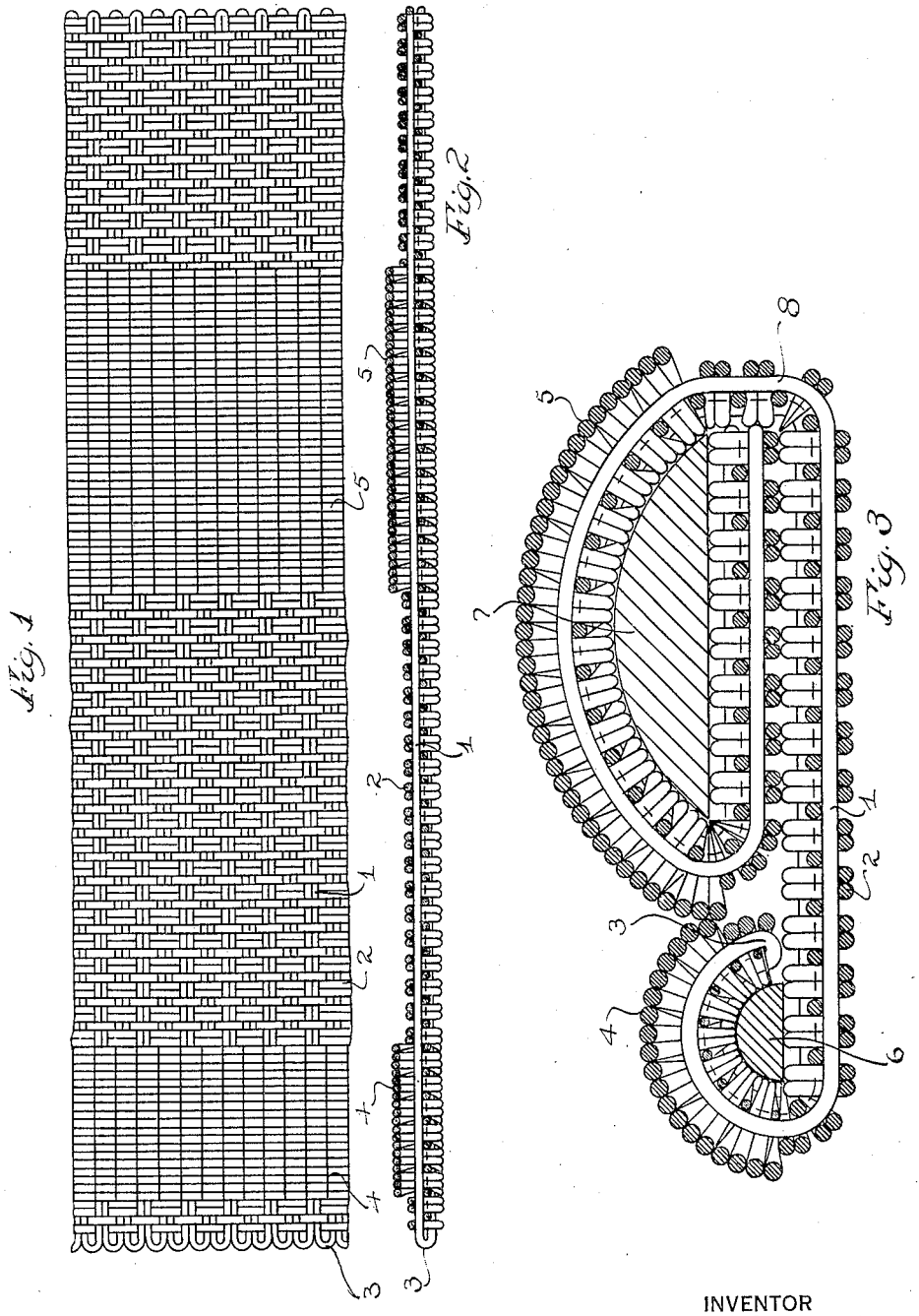
INVENTOR
Charles P. Schlegel
BY
H. H. Simms
his ATTORNEY May 2, 1933.    C. P. SCHLEGEL    1,906,814
FINISHING WELT FOR UPHOLSTERING
Filed Aug. 13, 1930    5 Sheets-Sheet 2

INVENTOR
Charles P. Schlegel
BY
His ATTORNEY

May 2, 1933. C. P. SCHLEGEL 1,906,814
FINISHING WELT FOR UPHOLSTERING
Filed Aug. 13, 1930 5 Sheets-Sheet 3
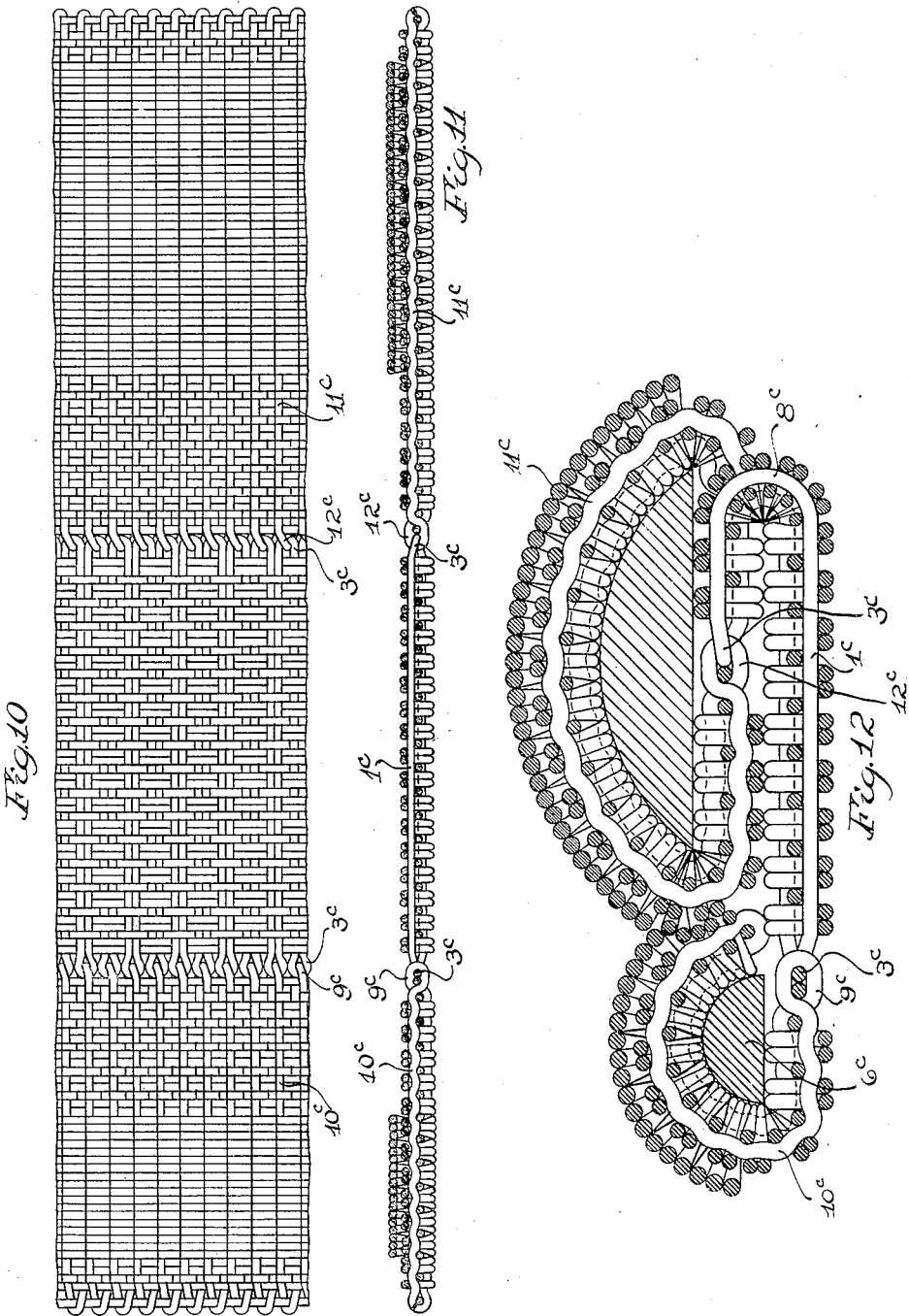
INVENTOR
Charles P. Schlegel
BY
his ATTORNEY

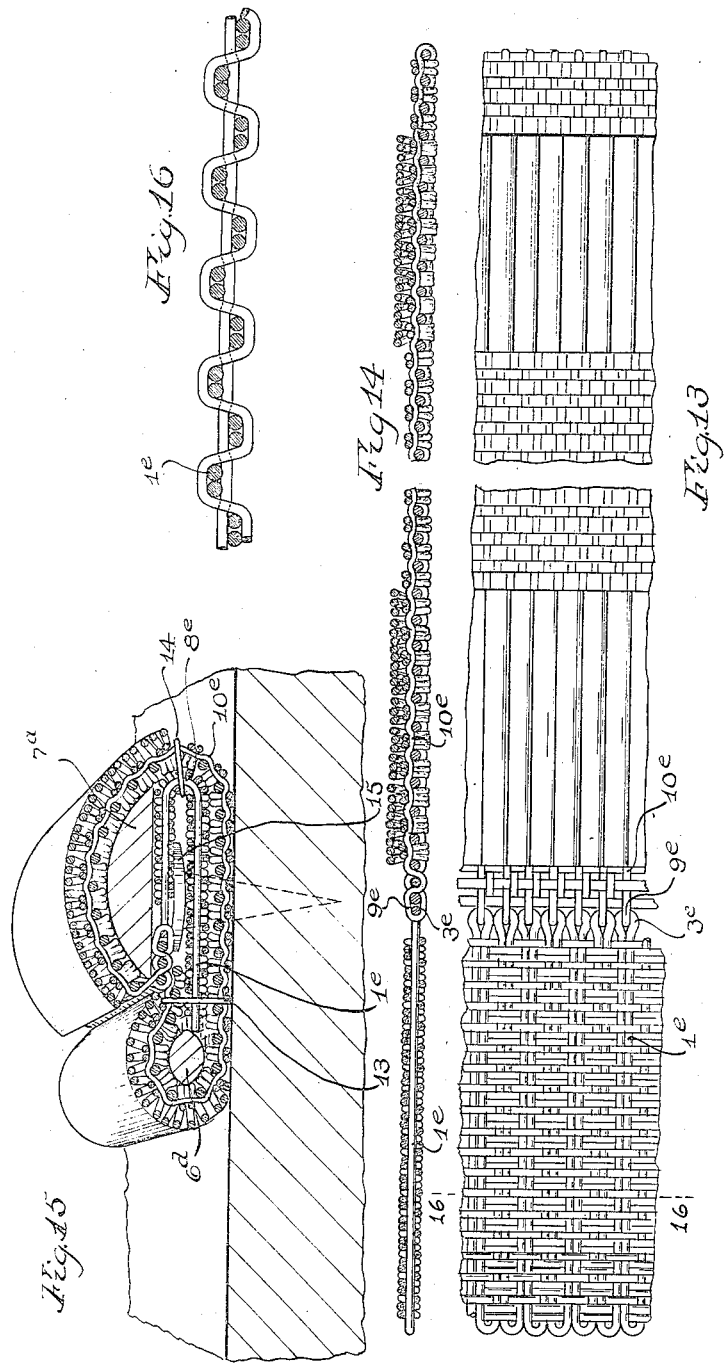

May 2, 1933. C. P. SCHLEGEL 1,906,814
FINISHING WELT FOR UPHOLSTERING
Filed Aug. 13, 1930 5 Sheets-Sheet 5

INVENTOR
Charles P. Schlegel
BY
his ATTORNEY

Patented May 2, 1933

1,906,814

UNITED STATES PATENT OFFICE

CHARLES P. SCHLEGEL, OF ROCHESTER, NEW YORK, ASSIGNOR TO THE SCHLEGEL MANUFACTURING COMPANY, OF ROCHESTER, NEW YORK, A CORPORATION OF NEW YORK

FINISHING WELT FOR UPHOLSTERING

Application filed August 13, 1930. Serial No. 474,925.

The present invention relates to finishing welts for upholstering and more particularly to the type in which a nail receiving portion is overlaid by a nail cover hingedly connected to one edge of the nail receiving portion.

An object of this invention is to include in a body fabric which forms the hinged connection between the nail receiving portion and the cover, a portion which has transversely extending strands of ductile material so formed that they may be woven in looms to act to hold the cover in covering position. Another object of the invention is to provide in a finishing welt of the class described, a body fabric which has at least two longitudinally extending woven portions, one of which has its weft strands formed of fibrous material, and the other of which has its weft strands formed of ductile material and serves to hold the cover over the nail receiving portion.

To these and other ends, the invention consists of certain parts and combinations of parts all of which will be hereinafter described: the novel features being pointed out in the appended claims.

In the drawings:

Figs. 1, 2 and 3 show enlargements of one embodiment of the invention in which ductile or soft wire weft strands extend from one side of the fabric to the other, Fig. 1 being a plan view of a fragment of the body fabric, Fig. 2 being a transverse section of the body fabric, and Fig. 3 being a transverse section through the finishing welt;

Figure 7:
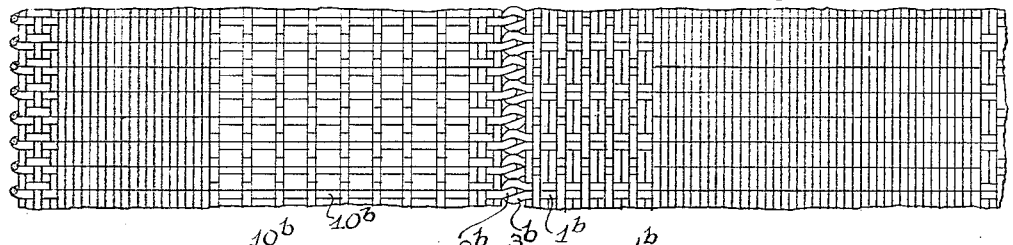
Figure 8:
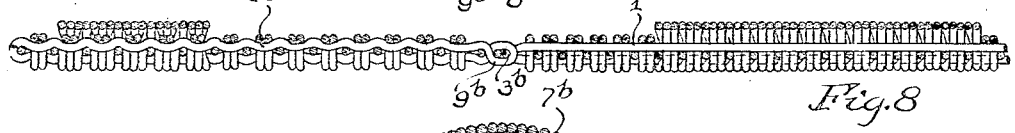
Figure 9:
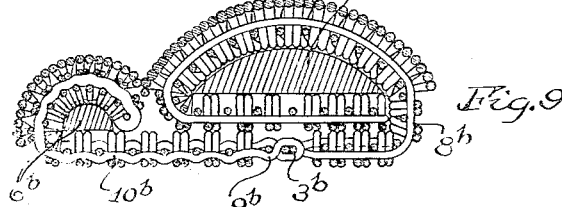
Figure 17:
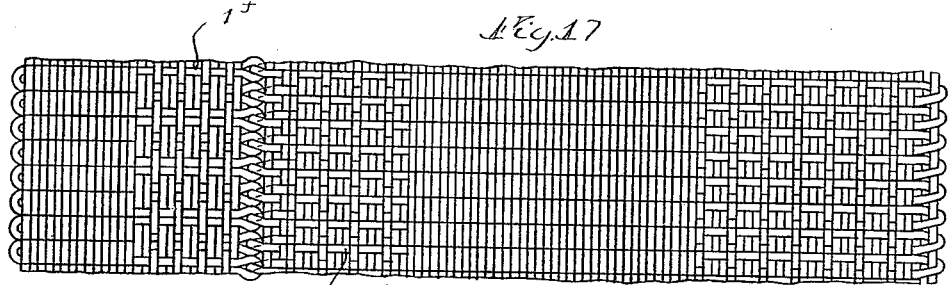
Figure 18:
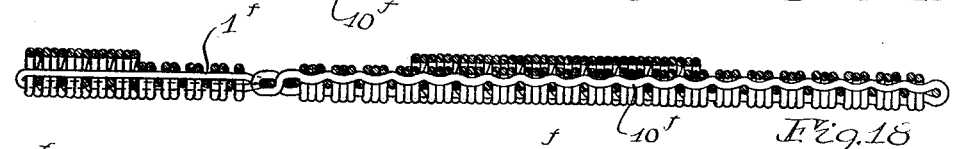
Figure 19:
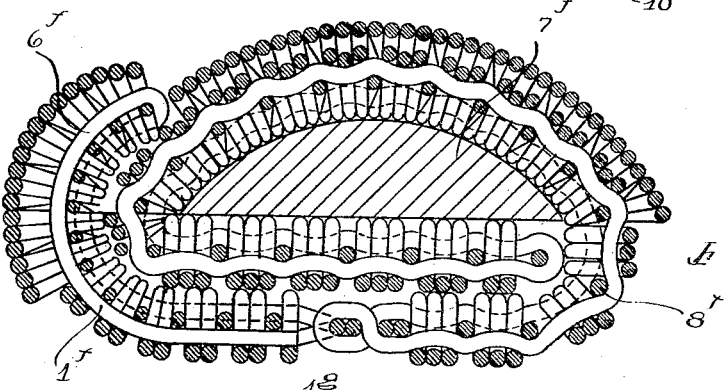

Figs. 7, 8 and 9 are enlarged views of still another embodiment of the invention in which the ductile weft strands extend throughout the cover portion of the fabric and into the nail receiving portion by way of the hinged connection, Fig. 7 being a fragmentary plan view of the body fabric, Fig. 8 being a transverse section through the body fabric, and Fig. 9 being a transverse section through the finishing welt;

Figs. 10, 11 and 12 show a further embodiment of the invention in which the ductile weft strands extend only partially into the cover portion and the nail receiving portion of the fabric; Fig. 10 being a fragmentary plan of the body fabric, Fig. 11 being a transverse section of the body fabric, and Fig. 12 being a transverse section of the finishing welt;

Figs. 13, 14, 15 and 16 illustrate a still further embodiment of the invention in which the nail receiving portion is formed by two layers, both forming part of the body fabric and both forming part of the hinged connection between the cover and the nail receiving portion, the upper layer having its transverse or weft strands formed of ductile material, Fig. 13 being a fragmentary plan of the body fabric, Fig. 14 being a transverse section of the body fabric, Fig. 15 being a transverse section of the finishing welt, and Fig. 16 being a fragmentary sectional view on the line 16—16, Fig. 13;

Figs. 17, 18 and 19 illustrate enlarged views of another and still further embodiment in which the bead is eliminated at the free edge of the nail receiving portion and the latter has ductile weft strands incorporated therein; Fig. 17 being a plan view of a fragment of the fabric; Fig. 18 being a vertical transverse section through the fabric; and Fig. 19 being a transverse section through the molding; and Figs. 20, 21, and 22 illustrate still another and further embodiment of the invention in which the cover is formed by two overlapping parts of the fabric hinged to opposite edges of the nail receiving portion and the ductile weft strands extend through both cover portions and the nail receiving portion.

Prior to this invention it has been suggested to incorporate in the body fabric of a finishing welt transverse strands of ductile wire at spaced points with intervening strands of fibrous material. So far as I am aware, this structure has not been put to commercial use for the reason, as I believe, that the expense of incorporating such ductile strands in the body fabric overcomes any advantage obtained from the use of the ductile strands, as such prior construction did not lend itself to an automatic weaving operation in a loom. Furthermore, the ends of the ductile strands in the prior suggested construction are free, thus permitting longitudinal movement of the strands.

In the embodiment shown in Figs. 17 to 19 inclusive, the fabric has two longitudinally extending portions, one having weft strands 1$^f$ formed of ductile metallic material, and the other having weft strands 10$^f$ of fibrous material interlooped with the strands 1$^f$. The longitudinally extending portion containing the weft strands 10$^f$ is bent around the filler 7$^f$ to provide a cover which extends through the hinge 8$^f$ and into the nail receiving portion. The longitudinally extending portion containing the weft strands 1$^f$ extends into the nail receiving portion and also into an overhanging portion 6$^f$. The tension on the strands 10$^f$, required to introduce the free edge of the cover under the overhanging portion 6$^f$, is sufficient to hold the cover in covering position beneath said overhanging portion.

Figure 20:
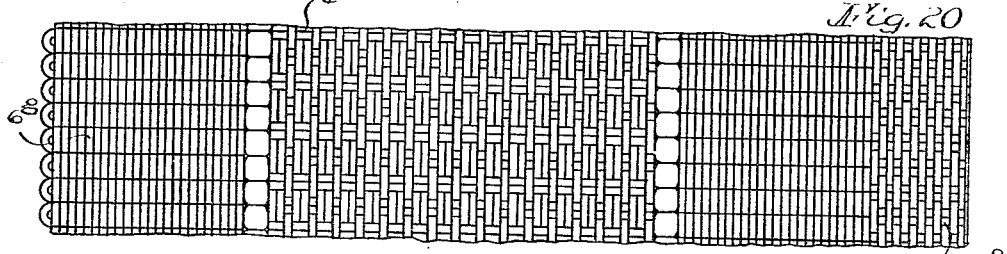
Figure 21:
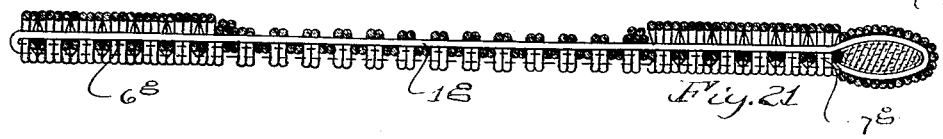
Figure 22:
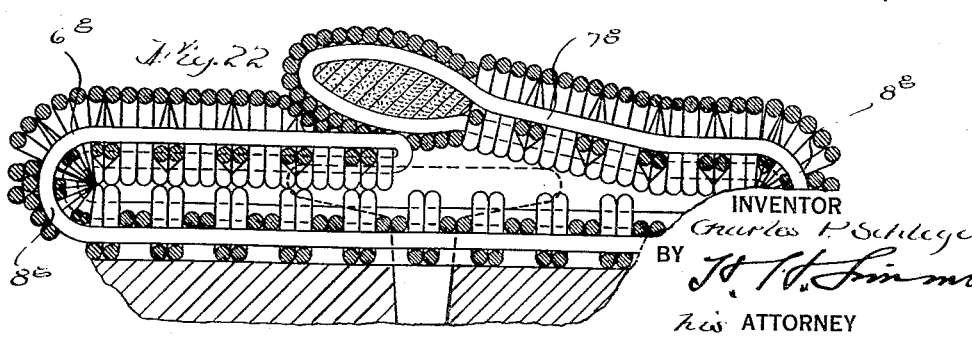

In the embodiment shown in Figs. 20 to 22, inclusive, weft strands 1$^g$ of ductile metal extend back and forth throughout the width of the fabric strip. The strip is bent longitudinally on two lines to provide two hinge portions 8$^g$, a central nail receiving portion between them and two cover portions 6$^g$ and 7$^g$ which overlie the nail receiving portion, the cover portion 7$^g$ having a filled portion at its free edge to overlap the cover portion 6$^g$ to conceal the joint between the two cover portions.

In all embodiments of the invention the body fabric may be woven on a commercial scale in a loom. The ductile weft strands are close together so that they provide better anchorage for the nails. Their ends are connected to form in effect a selvage edge so that longitudinal movement of such ductile strands is prevented. In some embodiments, the ductile strands connect by loops with loops of weft strands of a longitudinally extending and more highly flexible portion or portions which may be employed for covering one or more fillers employed in the welt. The term "ductile" is employed to denote a degree of flexibility which permits of ready bending by manipulations directed to that purpose but which offers sufficient resistance to enable the strands and fabric, after being shaped, to maintain such shape under ordinary usage.

According to this invention the ductile wire weft strands may be automatically woven into body fabric on a loom, and in addition, a greater number of ductile strands may be incorporated into the fabric and the ends of the ductile strands may be connected together to hold them in place in the fabric. Furthermore, it is not necessary to carry the ductile strands entirely across the body fabric but instead, the body fabric may have a portion extending longitudinally thereof provided with ductile weft strands and a longitudinally extending portion on either or both sides thereof provided with weft strands of fibrous material, thus giving certain portions of the body fabric greater flexibility or pliability than the portion provided with weft strands of ductile wire.

The body fabric shown in Figs. 1, 2 and 3 has all of its weft strands 1 extending throughout the width of the fabric and formed of ductile metallic wire, while its warp strands 2 are formed of fibrous material. The ends of the weft strands 1 are connected by loops 3, thus holding the warp against longitudinal movement. At 4 and 5 pile surfaces are formed, in this instance uncut. This body fabric is bent longitudinally to provide a nail receiving portion and a nail cover. The nail receiving portion is provided at its edge with a bead formed, in this instance, by bending the body fabric over a small filler 6, the pile surface 4 lying on the outer face of the bead. The cover is formed in this instance, by bending the body fabric about a filler 7 so that the pile surface 5 lies on the outer face of the cover. It will be noted that, in this way, the ductile material extends through the hinge portion 8 between the cover and the nail receiving portion and serves to hold the cover in position over the nail receiving portion, while, at the same time, permitting the cover to be raised and lowered at will. The ductile material also serves to hold the body fabric about the fillers 6 and 7 and thus may eliminate sewing operations. The close arrangement of the ductile material in the nail receiving portion of the welt provides a better anchorage for the nails which secure the welt in place.

Figure 4:
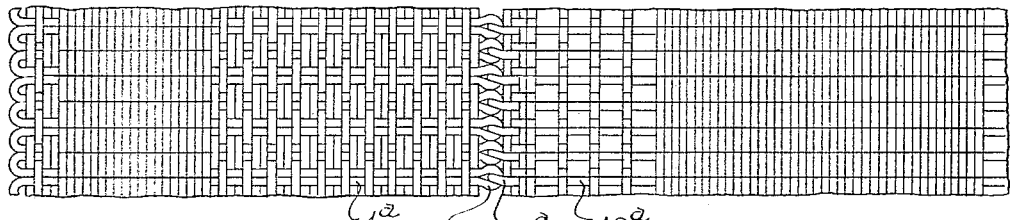
Figs. 4, 5 and 6 are enlarged views of another embodiment in which the ductile weft strands are arranged at one side of the fabric and fibrous weft strands are arranged at the other side of the fabric, Fig. 4 being a plan of a fragment of the fabric, Fig. 5 being a transverse section of the fabric, and Fig. 6 being a transverse section through the finishing welt.
Figure 5:
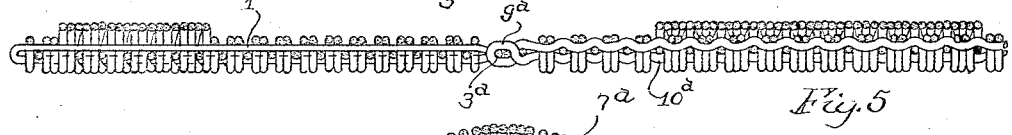
Figure 6:
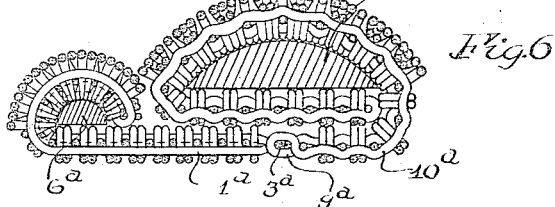

In the embodiment shown in Figs. 4, 5 and 6, the ductile weft strands 1$^a$ do not extend entirely across the body fabric but are arranged in a longitudinally extending portion at one side of the body fabric. Their loops 3$^a$ connect at one side with loops 9$^a$ of weft strands 10$^a$ formed of fibrous material and arranged in a longitudinally extending portion at the other side of the body fabric. The longitudinally extending portion containing the ductile wire weft strands 1$^a$ is bent around the filler 6$^a$ and also extends under the cover, whereas, the portion containing the weft strands 10$^a$ is turned about the filler 7$^a$ and also extends beneath the cover into the nail receiving portion. In this construction, the tension in the strands 10$^a$ tends to draw the reenforced bead including the filler 6$^a$ against the free edge of the cover and hold such cover in its covering position.

In the embodiment shown in Figs. 7, 8 and 9, the ductile weft strands 1ᵇ are on the opposite side of the body fabric from that shown in Figs. 4, 5 and 6. The longitudinally extending portion containing these weft strands 1ᵇ is wrapped about the filler 7ᵇ and extends through the hinge 8ᵇ and into the nail receiving portion. The longitudinally extending portion of the body fabric containing the weft strands 10ᵇ is wrapped about the filler 6ᵇ. The weft strands 3ᵇ and 9ᵇ are looped together at the meeting point between the two longitudinally extending portions. In this construction, the ductile strands hold the cover in any position to which it may be adjusted relatively to the nail receiving portion.

In the embodiment shown in Figs. 10, 11 and 12, three longitudinally extending portions are provided. The one containing the ductile weft strands 1ᶜ is at the center, whereas, the other two lie on opposite sides of the portion containing ductile weft strands and have weft strainds 10ᶜ and 11ᶜ respectively formed of fibrous material. The loop 3ᶜ at the ends of the weft strands 1ᶜ are interlooped with loops 9ᶜ and 12ᶜ formed respectively on the weft strands 10ᶜ and 11ᶜ. The longitudinally extending portion containing the weft strands 10ᶜ is wrapped about the filler 6ᶜ, whereas, the portion containing the weft strands 11ᶜ is wrapped about the filler 7ᶜ. The portion containing the ductile strands 1ᶜ forms that part of the nail receiving portion lying beneath the cover and extends through the hinge 8ᶜ and on the under side of the cover. In this way both fillers are covered by portions of the body piece having weft strands of fibrous material, thus making the covering of the fillers more easily accomplished.

In the embodiment shown in Figs. 13 to 16 inclusive, the body fabric is wider than that shown in the other embodiments, being sufficiently wide to cover both fillers 6ᵈ and 7ᵈ and also to provide an extension which will reenforce that portion of the nail receiving portion lying beneath the cover, while, at the same time reenforcing the hinge between the cover and the nail receiving portion. In this embodiment, the body fabric has a longitudinally extending portion provided with weft strands 1ᵉ formed of ductile wire and having loops 3ᵉ connecting with the loops 9ᵉ of the weft strands 10ᵉ formed of fibrous material. The portion containing the weft strands 10ᵉ is considerably wider than similar portions in other embodiments, so that it is wide enough to extend about the filler 6ᵈ, through the under fold of the nail receiving portion and over the outer face of the filler 7ᵈ to the under side of said filler. The portion containing the weft strands 1ᵉ extend over a large portion of the under side of the filler 7ᵈ thence passing through the hinge 8ᵉ and over the upper face of that portion containing the strands 10ᵉ in the nail receiving portion so that it forms part of the nail receiving portion of the welt, the free edge of the portion containing the strands 1ᵉ lying beneath the free edge of the portion containing the strands 10ᵉ and being secured thereto by stitching 13, stitching 14 securing the two portions forming the hinge. In this construction, both fillers are covered on their outer sides by portions of the body fabric in which the weft is formed of fibrous material, and, at the same time, the nail receiving portion has ductile weft strands arranged in close relationship, so that the nail 15 may have greater anchorage.

What I claim as my invention and desire to secure by Letters Patent is:

1. A finishing welt of the type comprising a nail receiving base, and a cover hingedly connected to the base to overlie the latter, distinguished by a body fabric forming the hinge connection between the two and including two longitudinally extending woven fabric portions one of said portions being arranged at one side of said body fabric and formed with weft strands of fibrous material, and the other portion being arranged on the other side of said body fabric and having a part thereof arranged to overlie said base, said other portion having weft strands of ductile material which serve to hold the cover in closed position over said base.

2. A finishing welt of the type comprising a nail receiving base, and a cover hingedly connected to the base to overlie the latter, distinguished by a body fabric forming the hinge connection between the two and including two longitudinally extending woven fabric portions, one of said portions being arranged at one side of said body fabric and formed with weft strands of fibrous material, and the other portion being arranged on the at one side of said body fabric and having a part thereof arranged to overlie said base, said other portion having weft strands of ductile material which serve to hold the cover in closed position over said base the weft strands of the two portions having looped connection.

3. A finishing welt of the type comprising a nail receiving base, and a cover hingedly connected to the base to overlie the latter, distinguished by a body fabric forming the hinge connection between the two and including a longitudinally extending portion arranged at one side of said body fabric and having a part thereof arranged to overlie said base to form said cover, said portion having weft strands of ductile material which serve to retain the cover in adjusted position relative to said base, and a filler in the cover portion surrounded by such body fabric, said fabric having another portion thereof arranged to engage said cover to hold the latter in position to cover said nail receiving base, 4. A finishing welt of the type comprising a nail receiving base and a cover hingedly connected to the nail receiving portion at one side, distinguished by an overhanging portion carried by the other side of the nail receiving base to overhang the free edge of the cover, and to hold the latter in position over said nail receiving base, said overhanging portion including a woven fabric having warp strands of fibrous material, weft strands of ductile metal, and looped connection between the ends of the weft strands, the weft strands extending into the overhanging portion and the nail receiving portion.

5. A finishing welt comprising a textile base adapted to receive fastening means, a portion extending from one edge of said base and arranged to form a cover adapted to be moved to and from position to cover said fastening means, and another portion extending from the opposite edge of said base and arranged to engage a part of said cover in the closed position of the latter, one of said portions being formed with weft strands of ductile material which extend the full width thereof and into the base and serve to hold the cover in position over said base.

6. A finishing welt comprising a textile base adapted to receive fastening means, a portion extending from one edge of said base and arranged to form a cover adapted to be moved to and from position to cover said fastening means, and another portion extending from the opposite edge of said base and arranged to engage a part of said cover in the closed position of the latter, one of said portions being formed with weft strands of ductile material which extend the full width thereof and into the base and serve to hold the cover in position over said base, the other of said portions having weft strands of fibrous material which extend the full width thereof and into said base, said fibrous strands being looped at their ends to said ductile strands.

7. A finishing welt comprising a textile base adapted to receive fastening means, a portion extending from one edge of said base and arranged to form a cover adapted to be moved to and from position to cover said fastening means, and a second portion extending from the opposite edge of said base and arranged to engage a part of said cover in the closed position of the latter, one of said portions being formed with weft strands of ductile material which extend the full width thereof and into said base, the other of said portions having weft strands of fibrous material which extend the full width thereof and into said base, said fibrous strands being looped to said ductile strands in said base intermediate said edges, said ductile strands cooperating with said second portion to retain the cover in closed position over the base.

8. A finishing welt made of a one-piece woven strip comprising a base portion adapted to receive fastening means for securing the welt in place, a portion extending at one side from said base portion and arranged to form a cover adapted to be moved to and from position to cover said fastening means, and another portion extending at the opposite side from said base portion and arranged to engage a part of said cover to releasably hold the same in covering position, one or more of said base and side portions having the weft strands thereof formed by stiffening interwoven wire strands looped at both ends about warp strands of the strip to afford finished edge portions and secure said weft strands against longitudinal displacement.

9. A finishing welt having a one-piece woven body fabric comprising a base adapted to receive fastening means for securing the welt in place, a portion extending at one side from said base and arranged to form a cover adapted to be moved to and from position to cover said fastening means, and another portion extending at the opposite side from said base and arranged to engage a part of said cover to releasably hold the same in covering position, one of said portions having stiffening weft strands of ductile wire woven thereinto and interlooped with the strands of said base to afford a hinge connection for separating said portions so that said cover portion may be raised to expose said base.

CHARLES P. SCHLEGEL.